United States Patent
Gabrielsen et al.

(10) Patent No.: US 12,269,997 B2
(45) Date of Patent: Apr. 8, 2025

(54) METHOD FOR PRODUCTION OF A TRANSPORTATION FUEL

(71) Applicant: Topsoe A/S, Kgs. Lyngby (DK)

(72) Inventors: Jostein Gabrielsen, Rødovre (DK);
Christine Hartmann Von Bülow, Copenhagen N (DK)

(73) Assignee: TOPSOE A/S, Kgs. Lyngby (DK)

( * ) Notice: Subject to any disclaimer, the term of this patent is extended or adjusted under 35 U.S.C. 154(b) by 0 days.

(21) Appl. No.: 18/701,709

(22) PCT Filed: Dec. 1, 2022

(86) PCT No.: PCT/EP2022/084046
§ 371 (c)(1),
(2) Date: Apr. 16, 2024

(87) PCT Pub. No.: WO2023/099658
PCT Pub. Date: Jun. 8, 2023

(65) Prior Publication Data
US 2024/0327721 A1    Oct. 3, 2024

(30) Foreign Application Priority Data

Dec. 2, 2021  (DK) .............................. PA202101149
Feb. 22, 2022  (EP) ..................................... 22157960

(51) Int. Cl.
| | | |
|---|---|---|
| C10G 3/00 | (2006.01) | |
| C10G 65/04 | (2006.01) | |
| C10G 65/08 | (2006.01) | |
| C10G 65/12 | (2006.01) | |

(52) U.S. Cl.
CPC ................ C10G 3/52 (2013.01); C10G 3/42 (2013.01); *C10G 65/043* (2013.01); *C10G 65/08* (2013.01); *C10G 65/12* (2013.01); *C10G 2300/1096* (2013.01); *C10G 2300/4012* (2013.01)

(58) Field of Classification Search
CPC .. C10G 3/42–52; C10G 65/043; C10G 65/08; C10G 65/12
See application file for complete search history.

(56) References Cited

U.S. PATENT DOCUMENTS

| | | |
|---|---|---|
| 8,440,875 B1 | 5/2013 | Eizenga |
| 2009/0163744 A1 | 6/2009 | Abhari |
| 2011/0152588 A1 | 6/2011 | Kothandaraman |
| 2014/0303057 A1 | 10/2014 | Abhari |

FOREIGN PATENT DOCUMENTS

| | | |
|---|---|---|
| WO | 2015107487 A1 | 7/2015 |
| WO | 2015181744 A1 | 12/2015 |

OTHER PUBLICATIONS

International Search Report mailed on Feb. 22, 2023, by the European Patent Office for International Application No. PCT/EP2022/084046 4 Pages.
European Search Report mailed on Jul. 15, 2022 by the European Patent Office for European Application No. EP22157960.0, 8 Pages.
Written Opinion mailed on Feb. 22, 2023, by the European Patent Office for International Application No. PCT/EP2022/084046, 8 Pages.
Danish Search Report mailed on May 30, 2022 by the Danish Patent Office for Danish Application No. PA202101149, 12 Pages.
Danish 4th Technical Examination (Grant Notification) mailed on Feb. 15, 2024 by the Danish Patent Office for Danish Application No. PA202101149, 2 Pages.
Danish 3rd Technical Examination (Grant Notification) mailed on Oct. 27, 2023 by the Danish Patent Office for Danish Application No. PA202101149, 4 Pages.
Danish 2nd Technical Examination (Official Action) mailed on Mar. 17, 2023 by the Danish Patent Office for Danish Application No. PA202101149, 3 Pages.
Danish 1st Technical Examination (Official Action) mailed on May 30, 2022 by the Danish Patent Office for Danish Application No. PA202101149, 9 Pages.

*Primary Examiner* — Renee Robinson
(74) *Attorney, Agent, or Firm* — Boone IP Law

(57) ABSTRACT

The present disclosure relates to a process for production of a hydrocarbon fraction from an oxygenate feedstock, comprising the steps of providing a process feed comprising an amount of an ammonia precursor, hydrogen and an amount of oxygenates at a temperature above 200° C., directing said process feed to contact a material catalytically active in hydrodeoxygenation (HDO) under hydrotreating conditions to provide a hydrodeoxygenated intermediate product, wherein said ammonia precursor provides an amount of ammonia corresponding to a partial pressure of $NH_3$ in the presence of said material catalytically active in hydrodeoxygenation being at least 0.1 mbar, This has the associated benefit that the ammonia precursor releases ammonia by thermal reaction, such that the presence of ammonia may limit the extent of formation of high boiling product in the hydrodeoxygenation process.

16 Claims, No Drawings

METHOD FOR PRODUCTION OF A
TRANSPORTATION FUEL

TECHNICAL FIELD

The present disclosure relates to a method for production of transportation fuels by hydroprocessing with increased yield in the transportation fuels boiling point range.

BACKGROUND ART

Conversion of oxygenates such as renewables to transportation fuels by hydroprocessing typically involve a side product boiling at high temperatures. In U.S. Pat. No. 8,440,875 neutralization of acidic feedstocks is proposed to protect equipment but also to reduce the polymerization of acidic feedstock. The feedstock of U.S. Pat. No. 8,440,875 is described as a feedstock having an acidity sufficient for requiring neutralization, and the amount of added ammonia or amine is similar implied to be sufficient for affecting the acidity significantly.

SUMMARY OF INVENTION

We have now identified that presence of low amounts of $NH_3$ in the gas phase when hydroprocessing such oxygenates reduces the formation of high boiling products.

Definitions

In the following the term stage shall be used for a section of the process, in which no separation is performed.

In the following the abbreviation ppmv shall be used to signify volumetric parts per million, e.g. molar gas concentration.

In the following the abbreviation $ppm_{molar}$ shall be used to signify atomic parts per million.

In the following the abbreviation wt/wt % shall be used to signify weight percentage.

In the following the abbreviation vol/vol % shall be used to signify volume percentage for a gas.

In the following the term renewable feedstock or hydrocarbon shall be used to indicate a feedstock or hydrocarbon originating from biological sources or waste recycle. Recycled waste of fossil origin such as plastic shall also be construed as renewable.

In the following the term hydrocarbonaceous shall be used to signify a composition having a structure of hydrocarbons, but possibly comprising an amount of heteroatoms, such as oxygen, sulfur, nitrogen and metals.

In the following the term oxygenates shall be used to signify a composition being rich in oxygenates, but not necessarily consisting only of oxygenate molecules.

In the following the term hydrodeoxygenation shall be used to signify removal of oxygen from oxygenates by formation of water in the presence of hydrogen, as well as removal of oxygen from oxygenates by formation of carbon oxides in the presence of hydrogen.

A material catalytically active in a chemical reaction such as hydrodeoxygenation or hydrocracking shall be understood as a material having significant catalytic activity and preference for said chemical reaction under the conditions used. As it will be realised by the skilled person, most reactions will show an amount of side reactions, but unless otherwise specified the term a material catalytically active in a chemical reaction shall be understood as a combination of a material and conditions under which a commercially relevant amount of conversion takes place with higher selectivity than any other chemical reaction.

In the following, the term topology of a molecular sieve is used in the sense described in the "Atlas of Zeolite Framework Types," Sixth Revised Edition, Elsevier, 2007, and three letter framework type codes are used in accordance herewith.

Technical Problem

The processes described in the present disclosure receives a renewable feedstock and/or an oxygenate feedstock which comprises one or more oxygenates taken from the group consisting of triglycerides, fatty acids, resin acids, ketones, aldehydes, alcohols, phenols and aromatic carboxylic acids where said oxygenates originate from one or more of a biological source, a gasification process, a pyrolysis process, Fischer-Tropsch synthesis, methanol based synthesis or a further synthesis process, especially obtained from a raw material of renewable origin, such as originating from plants, algae, animals, fish, vegetable oil refining, domestic waste, used cooking oil, plastic waste, rubber waste or industrial organic waste like tall oil or black liquor. Some of these feedstocks may contain aromatics; especially products derived by pyrolysis or other processes from e.g. lignin and wood or waste products from e.g. frying oil. Depending on source, the oxygenate feedstock may comprise from 1 wt/wt % to 40 wt/wt % atomic oxygen. Biological sources will typically comprise around 10 wt/wt % atomic oxygen, and derivation products from 1 wt/wt % to 20 wt/wt % or even 40 wt/wt % atomic oxygen.

For the conversion of renewable feedstocks and/or oxygenate feedstocks into hydrocarbon transportation fuels, the feedstocks are together with hydrogen directed to contact a material catalytically active in hydrotreatment, especially hydrodeoxygenation. Especially at elevated temperatures the catalytic hydrodeoxygenation process may have side reactions forming a heavy product e.g. from olefinic molecules in the feedstock. To moderate the release of heat, a liquid hydrocarbon may be added, e.g. a liquid recycle stream or an external diluent feed. If the process is designed for co-processing of fossil feedstock and renewable feedstock, it is convenient to use the fossil feedstock as diluent, since less heat is released during processing of fossil feedstock, as fewer heteroatoms are released and less olefins are saturated. In addition to moderating the temperature, the recycle or diluent also has the effect of reducing the potential of the feedstock to polymerize. The resulting product stream will be a hydrodeoxygenated intermediate product stream comprising hydrocarbons, typically n-paraffins, and sour gases such as CO, $CO_2$, $H_2O$, $H_2S$, $NH_3$ as well as light hydrocarbons, especially C3 and methane.

Solution to Problem

Typically, hydrodeoxygenation involves directing the feedstock to contact a catalytically active material typically comprising one or more sulfided metals taken from the group of nickel, cobalt, molybdenum or tungsten, supported on a carrier comprising one or more refractory oxides, typically alumina, but possibly silica or titania. The support is typically amorphous. The catalytically active material may comprise further components, such as boron or phosphorous. The conditions are typically a temperature in the interval 250-400° C., a pressure in the interval 30-150 Bar, and a liquid hourly space velocity (LHSV) in the interval 0.1-2. Hydrodeoxygenation is typically exothermal, and with the presence of a high amount of oxygenates, the process may beneficially involve intermediate cooling e.g. by quenching with cold hydrogen, feed or product. The feedstock may preferably contain an amount of sulfur to ensure sulfidation of the metals, in order to maintain their activity. If the gas phase comprises less than 10, 50 or 100 ppm$_v$ sulfur, a sulfide donor, such as dimethyldisulfide (DMDS) or dipropyldisulfide (DPDS) may be added to the feed.

In the presence of a catalytically active material active in hydrodeoxygenation, formation of a high boiling product may also take place, possibly by reactions combining two alkanes or fatty acids. The exact mechanism remains unclear, but we have now identified that in the presence of moderate amounts of ammonia in the gas phase, this formation of high boiling product is reduced. Without being bound by theory, we consider a likely mechanism for the formation of high boiling components to be dimerization of unsaturated fatty acids, which may either be free fatty acids or part of e.g. triglycerides, through Diels-Alder reaction and/or radical addition. Moderate amounts of ammonia may neutralize the Lewis acidic sites, known to catalyze the Diels-Alder reaction, present on the alumina carrier used for the HDO catalyst.

Therefore, we propose a process with the combined presence of the material catalytically active in hydrodeoxygenation and an amount of ammonia corresponding to a partial pressure of at least 0.1 mbar, 0.5 mbar or 1 mbar. The ammonia may be provided to the process in multiple way, including addition of aqueous ammonia or amines upstream the reactor, a presence of ammonia in the fresh or recycle gas comprising hydrogen which may either be added to the process or collected and recycled to the hydrodeoxygenation process. The ammonia precursor may also be a solution comprising a salt in neutral form, such as ammonium sulfate or ammonium carbonate, which does not affect the acidity of the feedstock but still has the effect upon the reaction.

For the hydrodeoxygenated intermediate product stream to be used it may be required that the boiling point range is adjusted. A boiling point adjustment may also be required if an amount of heavy product is present in hydrodeoxygenated intermediate. The boiling point is adjusted by hydrocracking of long paraffins to shorter paraffins, by directing the hydrodeoxygenated intermediate product to contact a material catalytically active in hydrocracking.

Hydrocracking involves directing the intermediate hydrodeoxygenated feedstock to contact a material catalytically active in hydrocracking. The material catalytically active in hydrocracking typically comprises an active metal (which may be one or more elemental noble metals such as platinum and/or palladium or one or more sulfided base metals such as nickel, cobalt, tungsten and/or molybdenum), an acidic support (typically a molecular sieve showing high cracking activity, and having a topology such as MFI, BEA and FAU, but amorphous acidic oxides such as silica-alumina may also be used) and a refractory support (such as alumina, silica or titania, or combinations thereof). The catalytically active material may comprise further components, such as boron or phosphorous. Preferred hydrocracking catalysts comprise molecular sieves such as ZSM-5, zeolite Y or beta zeolite.

The conditions are typically a temperature in the interval 250-400° C., a pressure in the interval 30-150 Bar, and a liquid hourly space velocity (LHSV) in the interval 0.5-4. As hydrocracking is exothermal, the process may involve intermediate cooling e.g. by quenching with cold hydrogen, feed or product. The active metal(s) on the material catalytically active in hydrocracking may be either a noble metal or a base metal. If it is a base metal the intermediate hydrodeoxygenated feedstock including the gas phase is typically directed to contact the material catalytically active in hydrocracking without further purification. This gas phase of this mixture should preferably contain at least 50 ppm$_v$ sulfur. If the active metal is a noble metal, purification is required.

The hydrocracked intermediate product will mainly be linear hydrocarbons, like the feedstock, or if the feedstock comprises triglycerides, n-paraffins, but possibly of a shorter length than the fatty acids. Typically, the hydrocracked intermediate product will be dominated by linear alkanes having boiling point range (250° C. to 320° C.) and a freezing point (0° C. to 30° C.) unsuited for use as transportation fuel. Some heavy components and aromatics may also be formed in the hydrodeoxygenation step if the unsaturated fatty acids polymerizes.

Especially if the product has a linear structure, the freezing point may have to be adjusted for the product to be used as a fuel in practice. The freezing point is adjusted by isomerization of n-paraffins to i-paraffins, by directing the hydrocracked intermediate product to contact a material catalytically active in isomerization The material catalytically active in isomerization typically comprises an active metal (which may be one or more elemental noble metals such as platinum and/or palladium or one or more sulfided base metals such as nickel, cobalt, tungsten and/or molybdenum), an acidic support (typically a molecular sieve showing high shape selectivity, and having a topology such as MOR, FER, MRE, MWW, AEL, TON and MTT) and a typically amorphous refractory support (such as alumina, silica or titania, or combinations thereof). The catalytically active material may comprise further components, such as boron or phosphorous. Preferred isomerization catalysts comprise molecular sieves such as EU-2, ZSM-48, beta zeolite and combined beta zeolite and zeolite Y.

Typically, isomerization involves directing the intermediate hydrocracked feedstock to contact a material catalytically active in isomerization. The conditions are typically a temperature in the interval 250-400° C., a pressure in the interval 30-150 Bar, and a liquid hourly space velocity (LHSV) in the interval 0.5-8. Isomerization is substantially thermally neutral and consumes only hydrogen in hydrocracking side reactions so only a moderate amount of hydrogen is added in the isomerization reactor. When the active metal on the material catalytically active in isomerization is a noble metal, the hydrocracked feedstock is typically purified by gas/liquid separation to reduce the content of potential catalyst poisons to low levels such as levels of sulfur, nitrogen and carbon oxides to below 1-10 ppm.

Hydrodeoxygenation of unsaturated fatty acids may produce aromatics as a side reaction. Therefore, even for an oxygenate feedstock comprising less than 1% aromatics, it may be further necessary to direct the isomerized product to contact a material catalytically active in hydrodearomatization.

In some instances, hydrodearomatization may be satisfactorily carried out in the presence of the material catalytically active in hydroisomerization, but it may also be necessary to have a separate reactor or reactor bed with material catalytically active in hydrodearomatization.

Such a material catalytically active in hydrodearomatization typically comprises an active metal (either sulfided base metals such as nickel, cobalt, tungsten and/or molybdenum or—after purification, by removal of e.g. hydrogen sulfide—noble metals such as platinum and/or palladium) and a refractory support (such as amorphous silica-alumina, alumina, silica or titania, or combinations thereof). Since hydrodearomatization is equilibrium controlled, with high temperatures favoring aromatics, noble metals are preferred as the active metal, since they are active at lower temperatures, compared to base metals.

Typically, hydrodearomatization involves directing an intermediate product to contact a material catalytically active in hydrodearomatization. As the equilibrium between aromatics and saturation molecules shifts towards aromatics at elevated temperatures, it is preferred that the temperature is moderate. The conditions are typically a temperature in the interval 200-350° C., a pressure in the interval 30-150 Bar, and a liquid hourly space velocity (LHSV) in the interval 0.5-8. The preferred active metal(s) on the material catalytically active in hydrodearomatization is often preferred to be noble metal(s), since noble metal catalysts in general are active at lower temperatures than comparable base metal catalysts. According to the present disclosure, the isomerized product is typically sufficiently purified, as the active metal(s) in the material catalytically active in isomerization is a noble metal. Base metal catalysts may also be used, and in this case the gas phase associated with the intermediate hydroisomerized feedstock preferably contains at least 50 $ppm_v$ sulfur. Often a hydrocracking or hydroisomerization catalyst operating at temperatures below 350° C. will be able to catalyze moderate hydrodearomatization, e.g. reducing 10 wt/wt % aromatics to below 0.5 wt/wt % aromatics.

This necessity to combine 3 or 4 catalytically active materials for conversion of renewable feedstocks into transportation fuels naturally complicates the process layout, and the sequence of the materials must be considered carefully. In addition, recycle may be used for three different purposes; gas recycle for efficient use of hydrogen, liquid recycle around the material catalytically active in hydrocracking to maximize the yield of the kerosene fraction and liquid recycle around the material catalytically active in hydrodeoxygenation to limit the temperature increase due to exothermal hydrodeoxygenation reactions.

As isomerization and hydrodearomatization are preferably carried out using a catalytically active material comprising noble metals, "sour gases", including hydrogen sulfide, carbon dioxide and ammonia, are removed prior to this reaction. An amount of the intermediate product of hydrocracking may also be recycled to the inlet of the hydrodeoxygenation reactor.

Operating, with recycle around the hydrocracking reactors, has the benefit of allowing high hydrocracking conversion by multiple passes, rather than by severe condition, thus allowing for full conversion at moderate temperatures, and thus moderate yield loss, thus maintaining a high yield of kerosene and minimized over-cracking to naphtha and lighter. The use of an isomerization catalyst to improve freezing point of the transportation fuel, allows increasing the distillation endpoint of the transportation fuel while still meeting freezing point requirement.

One embodiment according to the present disclosure corresponds to a process in which a stream comprising oxygenates and recycled hydrocarbons, and further comprising an ammonia precursor and an amount of sulfur is directed to a hydrodeoxygenation reactor containing a catalytically active material comprising one or more base metals and a refractory support, with low acidity. Such a material is active in hydrodeoxygenation and other hydrotreatment reactions for removing heteroatoms and double bonds. The recycled hydrocarbons contribute as a heat sink, absorbing the released heat of reaction from the hydrodeoxygenation, thus maintaining a moderate temperature in the hydrodeoxygenation reactor. This step provides a stream comprising a high amount of saturated linear alkanes, in combination with an amount of water, CO, $CO_2$, methane, hydrogen sulfide and ammonia. This stream is cooled, water, commonly present in a concentration of 10 wt %, is condensed and gases are removed for recycling of hydrogen, The condensed water will contain dissolved ammonia, hydrogen sulfide and $CO_2$, and due to the acidity due to the high amounts of hydrogen sulfide and $CO_2$, the solubility of ammonia in the water is almost unlimited. Therefore, the ammonia content of the recycled gas phase after condensation is only fractions of $ppm_{wt}$.

The hydrodeoxygenated hydrocarbon stream is directed to a hydrocracking reactor to contact a catalytically active material comprising either one or more sulfided base metals or one or more elemental noble metals and a refractory support with high acidity. Such a material is active in hydrocracking, and this step provides a stream in which higher boiling hydrocarbons are converted to lower boiling hydrocarbons. The severity of the hydrocracking process will define the boiling point characteristics of the product, and the hydrocracking process will typically be operated with full conversion of the fraction boiling above the diesel range. If hydrocracking severity is selected for full conversion of the fraction boiling above the jet range the yield loss to gases and naphtha will typically be too high.

The hydrocracked stream may be directed to a separation section, withdrawing water, hydrogen sulfide and ammonia, and providing a sweet hydrocarbon stream. An amount of the sweet hydrocarbon stream is recycled as sweet recycled hydrocarbons and an amount is directed as feed to an isomerization reactor containing a material catalytically active in isomerization and optionally a material catalytically active in hydrodearomatization. Both materials may be based on a noble metal catalyst, such as platinum, palladium or a combination, in combination with an acidic support, but configurations with sulfided base metal catalysts are also possible. For isomerization the acidic support is preferably shape selective, to provide a selective isomerization, rearranging linear alkanes to branched alkanes, with minimal production of lighter hydrocarbons.

For hydrodearomatization, an acidic support also contributes to the reaction by ring opening, and in addition as the activity of noble metals is higher than that of base metals, the reaction will take place at lower temperatures. As the equilibrium between aromatic and non-aromatic compounds is shifted away from aromatics at low temperatures, noble metals provide the benefit that the lower temperature matches the equilibrium. Hydrodearomatization may even take place on the material catalytically active in isomerization, which often will have some hydrodearomatization activity.

The layout provides a conversion of feedstock to diesel, jet range or lighter product, as some or even all heavy hydrodeoxygenated hydrocarbons may be hydrocracked to yield lighter products. Jet/diesel co-production or only diesel production is possible, and if the conversion of boiling point is mainly carried out in a combined hydrodeoxygenation and hydrocracking stage employing base metal catalysts only, addition of sulfur in the form of DMDS in a single process position is enabled. Furthermore, the adjustment of freezing point may be made selectively by isomerization on a noble metal catalyst, independently of hydrocracking conditions.

Should it be desired to produce only diesel and no jet fuel, hydrocracking may not be desired. In this case, it may be preferred to either by-pass the hydrocracking reactor or alternatively cool the product prior to this reactor, such that it is inactive. The process plant may be configured for allowing such a configuration with short notice, e.g. by setting up appropriate equipment and control in the control room.

Advantageous Effects of Invention

A first aspect of the present disclosure relates to a process for production of a hydrocarbon fraction from an oxygenate feedstock, comprising the steps of providing a process feed comprising an amount of an ammonia precursor, hydrogen and an amount of oxygenates, directing said process feed to contact a material catalytically active in hydrodeoxygenation (HDO) under hydrotreating conditions to provide a hydrodeoxygenated intermediate product, wherein said ammonia precursor provides an amount of ammonia corresponding to a partial pressure of NH3 in the presence of said material catalytically active in hydrodeoxygenation being at least 0.1 mbar, 0.5 mbar or 1 mbar and less than 20 mbar, 10 mbar or 5 mbar.

This has the associated benefit that the ammonia precursor releases a limited amount of ammonia by thermal reaction, e.g 0.1 mbar NH3 will corresponding to 0.5 $ppm_{wt}$ at 20 bar process pressure and 0.17 $ppm_{wt}$ at 60 bar. 20 mbar NH3 will correspond to 100 $ppm_{wt}$ at 20 bar process pressure and 33 $ppm_{wt}$ at 60 bar. This amount of ammonia correspond to an insignificant amount of the reactive fatty acids in the feedstock, such that the presence of ammonia may limit the catalyst activity for formation of high boiling product in the hydrodeoxygenation process, e.g. to less than 10 wt %, 5 wt % or 3 wt % boiling above 370° C., while the addition is not sufficient for significant neutralization of acidic feedstocks, e.g. by changing the TAN value of the feedstock by less than 2 mg KOH/g, 1 mg KOH/g or 0.5 mg KOH/g An alternative first aspect of the present disclosure relates to a process for production of a hydrocarbon fraction from an oxygenate feedstock, comprising the steps of providing a process feed comprising an amount of an ammonia precursor, hydrogen and an amount of said oxygenate feedstock, directing said process feed to contact a material catalytically active in hydrodeoxygenation (HDO) under hydrotreating conditions to provide a hydrodeoxygenated intermediate product, wherein said ammonia precursor provides an amount of ammonia corresponding to a partial pressure of NH3 in the presence of said material catalytically active in hydrodeoxygenation being at least 0.1 mbar, 0.5 mbar or 1 mbar and less than 20 mbar, 10 mbar or 5 mbar.

This has the associated benefit that the ammonia precursor releases ammonia by thermal reaction, such that the presence of ammonia may limit the extent of formation of high boiling product in the hydrodeoxygenation process, e.g. to less than 10 wt %, 5 wt % or 3 wt % boiling above 370° C.

A second aspect of the disclosure relates to a process according to an aspect above wherein said oxygenate feedstock or said process feed comprises at least 50 wt/wt % fatty acid esters or fatty acids.

This has the associated benefit of such a process feed being available as a waste product or as an energy crop and simple to convert to a transportation fuel.

A third aspect of the disclosure relates to a process according to an aspect above wherein said oxygenate feedstock or said process feed comprises at least 20 wt/wt % aromatics.

This has the associated benefit of such a process feed being available as a product from thermal decomposition of waste or energy crops and simple to convert to a transportation fuel.

A fourth aspect of the disclosure relates to a process according to an aspect above, wherein at least an amount of said ammonia precursor is provided in a separate liquid ammonia precursor stream.

This has the associated benefit of providing and controlling the amount of the ammonia precursor to the process independently of the composition and handling of the feedstock.

A fifth aspect of the disclosure relates to a process according to an aspect above, wherein at least an amount of said liquid ammonia precursor stream comprises an aqueous ammonia solution, a solution of an aqueous ammonia salt, such as ammonium carbonate or ammonium sulfate or an amine, such as dibutylamine, tertbutylamine, monoethanolamine, diethanolamine, methyl diethanolamine, This has the associated benefit of these compounds being commercially available and approved for use in the refinery industry.

A sixth aspect of the disclosure relates to a process according to an aspect above, wherein said liquid ammonia precursor stream comprises an amount of ammonium, ammonia or amine withdrawn from a downstream process position.

This has the associated benefit of such a stream being withdrawn from a downstream process, such as either sour water from a three phase separator or a purge stream from an amine column may be a cost effective source of ammonia precursor.

A seventh aspect of the disclosure relates to a process according to an aspect above, wherein said liquid ammonia precursor stream has a pH below 8.

This has the associated benefit of not influencing the process by neutralization of the feedstock or intermediate products.

An eighth aspect of the disclosure relates to a process according to an aspect above, further comprising one or more additional process steps taken from the group off hydrocracking, isomerization and hydrodearomatization of intermediate streams in the process.

This has the associated benefit of such steps adjusting the properties of intermediate streams and product to match specific requirements.

A ninth aspect of the disclosure relates to a process according to the eighth aspect above, further comprising the step of separating one or more intermediate streams in a gas stream, an non-polar liquid stream and optionally an polar liquid stream optionally prior to directing an amount of the non-polar stream to one or more of said additional process steps.

This has the associated benefit of enabling separating the non-polar liquid stream from the remainder of streams and optionally upgrading only the non-polar stream in said additional process steps.

A tenth aspect of the disclosure relates to a process according to the ninth aspect above, wherein at least an amount of said gas stream, optionally after partial or full purification, is directed to be comprised in said process feed.

This has the associated benefit of enabling recycle of sulfur and/or ammonia to the process feed in the gas phase.

An eleventh aspect of the disclosure relates to a process according to the ninth or tenth aspect above, wherein at least an amount of said polar liquid stream is directed to be comprised in said process feed.

This has the associated benefit of enabling recycle of sulfur and/or ammonia to the process feed in the liquid phase.

A twelfth aspect of the disclosure relates to a process according to the ninth, tenth or eleventh aspect above, wherein at least an amount of said non-polar liquid stream is directed to be comprised in said process feed.

This has the associated benefit of enabling recycle of a diluent stream, which may be cooled and used as a heat sink and which also may limit the extent of polymerization in the process.

A thirteenth aspect of the disclosure relates to a process plant configured for carrying out the process according to any aspect above.

EXAMPLES

The effect of the present disclosure was evaluated by hydrotreating of a refined, deodorized and bleached soybean oil with a total acid number of 0.056 mg KOH/g. This acid number is very low, so the oil had no relevant need for neutralization. The soybean oil feedstock is further characterized in Table 1.

Hydrotreatment was carried out in a once-through pilot plant consisting of one reactor loaded with HDO catalysts. The HDO was carried out at LHSV 0.5, temperature 290-295 C and 50-65 barg pressure.

Pure hydrogen was used as treat gas while dibutylamine (DBA), in a range corresponding to 0-45 $ppm_{wt}$ elemental nitrogen, and dipropyl-disulfide (DPDS), corresponding to 340 $ppm_{wt}$ elemental sulfur, was added to the liquid feed. DBA and DPDS decompose to $NH_3$ and $H_2S$ respectively in presence of $H_2$ at elevated temperatures, thus at the reactor inlet the gas feed consists of hydrogen, $H_2S$ and $NH_3$. $NH_3$. A summary of the experimental data can be found in Table 2.

A stacked bed of two hydrogenation catalyst were used in the experiment. The upper layer in the reactor, 60% vol of total, was a commercially available catalyst comprising 15 wt % sulfided molybdenum on an alumina carrier, while the bottom layer, 40% vol of total, was a commercial sulfided 3 wt % nickel and 15 wt % molybdenum catalyst on an alumina carrier. The experiment was carried out in down flow mode, thus the feed to the reactor met the upper layer of the catalyst first.

From Table 2 it is clearly seen that with increasing $NH_3$ partial pressure, the amount of product boiling above 370° C. (the column % wt BP>370° C.)—i.e. above $C_{22}H_{46}$ which boils at 369° C., decreases from 7.5 wt % at 0.15 mbar partial pressure to 3.9 wt % at 2.8 mbar partial pressure.

In a second example the effect of the present disclosure, for an acidic feedstock comprising organic nitrogen was evaluated by hydrotreating of a distiller's corn oil sample, which contains 70 $ppm_{wt}$ organic nitrogen. The TAN value for this sample was 25 mg KOH/g. The distillers corn oil is further characterized in Table 3.

Hydrotreatment was carried out in a once-through pilot plant consisting of one reactor loaded with HDO catalysts. The HDO was carried out at LHSV 0.5, temperature 290-295 C and 50-65 barg pressure.

Pure hydrogen was used as treat gas while dibutylamine (DBA), in a range corresponding to 0-45 $ppm_{wt}$ elemental nitrogen, and dipropyl-disulfide (DPDS), corresponding to 340 $ppm_{wt}$ elemental sulfur, was added to the liquid feed. DBA and DPDS decompose to $NH_3$ and $H_2S$ respectively in presence of $H_2$ at elevated temperatures, thus at the reactor inlet the gas feed consists of hydrogen, $H_2S$ and $NH_3$. A summary of the experimental data can be found in Table 2.

A stacked bed of two hydrogenation catalyst were used in the experiment. The upper layer in the reactor, 60% vol of total, was a commercially available catalyst comprising 15 wt % sulfided molybdenum on an alumina carrier, while the bottom layer, 40% vol of total, was a commercial sulfided 3 wt % nickel and 15 wt % molybdenum catalyst on an alumina carrier. The experiment was carried out in down flow mode, thus the feed to the reactor met the upper layer of the catalyst first.

From Table 4 it is clearly seen that with increasing $NH_3$ partial pressure, the amount of product boiling above 370° C. (the column % wt BP>370° C.) decreases from 8.9 wt % at 0 mbar partial pressure to 6.4 wt % at 3.0 mbar partial pressure. The highest addition of DBA 45 $ppm_{wt}$ would correspond to a theoretical maximum reduction of TAN of approximately 0.2 mg KOH/g, and therefore this is unlikely to be the cause of the effect, since the feedstock would still have a TAN value of 24.8 mg KOH/kg, and thus the expected effect of increased $NH_3$ partial pressure from $NH_3$ interaction with fatty acids, would be a relative reduction of polymerization corresponding to the relative reduction in reactive fatty acids by 0.8%, and not the observed reduction from 8.9 wt % to 6.4 wt % (i.e. 28% less heavy product). At addition corresponding to 20 mbar the expected relative effect from direct interaction with the feedstock would start to be significant, since this would correspond to neutralization of 5-6% of the fatty acids, and therefore the surprising effect assumed to be caused by catalyst moderation is not considered significant above this limit.

A comparison of Table 2 and Table 4 shows that in both cases a formation of heavy product is happening, as evidenced by the presence of 3.9 wt % to 8.5 wt % boiling above 370° C., contrary to the 0.3 wt % present in the feedstock. However, this formation is clearly reduced by the presence of $NH_3$. The effect of $NH_3$ partial pressure is similar for a non-acidic, nitrogen depleted feedstock and an acidic feedstock comprising organic nitrogen. This confirms the effect of a moderate $NH_3$ partial pressure at the catalyst bed inlet upon limiting the formation of heavy product during hydrodeoxygenation, and that this effect is not obtained from the presence of organic nitrogen.

TABLE 1

| Property | Unit | Method | Value |
| --- | --- | --- | --- |
| N | wt ppm | D 4629 | <1 |
| S | wt ppm | D 7039 | <1 |
| H | wt % | D 7171 | 11.55 |
| C16 | wt % | | 11.0 |
| C18 | wt % | | 87.5 |
| C20 | wt % | | 0.7 |
| C22 | wt % | | 0.4 |
| C24 | wt % | | 0.3 |
| TAN | mg KOH/g | | 0.06 |

TABLE 2

| Temp [C.] | Total Pressure [barg] | LHSV [1/h] | H2/oil [Nl/l] | $p_{NH3}$ [mbar] | % wt BP > 370° C. |
| --- | --- | --- | --- | --- | --- |
| 295 | 50 | 0.5 | 1500 | 0.15 | 7.5 |
| 290 | 50 | 0.5 | 1500 | 1.0 | 5.9 |
| 290 | 50 | 0.5 | 1500 | 2.2 | 5.2 |
| 290 | 56 | 0.5 | 1500 | 2.4 | 4.7 |

TABLE 2-continued

| Temp [C.] | Total Pressure [barg] | LHSV [1/h] | H2/oil [Nl/l] | p$_{NH3}$ [mbar] | % wt BP > 370° C. |
|---|---|---|---|---|---|
| 290 | 56 | 0.5 | 1500 | 2.4 | 4.9 |
| 290 | 65 | 0.5 | 1500 | 2.8 | 3.9 |

TABLE 3

| Property | Unit | Method | Value |
|---|---|---|---|
| N | wt ppm | D 4629 | 70 |
| S | wt ppm | D 7039 | 17 |
| H | wt % | D 7171 | 11.59 |
| C16 | wt % | | 12.4 |
| C18 | wt % | | 85.4 |
| C20 | wt % | | 0.7 |
| C22 | wt % | | 0.0 |
| C24 | wt % | | 0.3 |
| TAN | mg KOH/g | | 0.06 |

TABLE 4

| Temp [C.] | Total Pressure [barg] | LHSV [1/h] | H2/oil [Nl/l] | p$_{NH3}$ [mbar] | % wt BP > 370° C. |
|---|---|---|---|---|---|
| 300 | 50 | 0.5 | 1500 | 0.0 | 8.9 |
| 296 | 50 | 0.5 | 1500 | 0.0 | 8.7 |
| 291 | 50 | 0.5 | 1500 | 0.0 | 8.3 |
| 291 | 50 | 0.5 | 1500 | 1.0 | 8.1 |
| 291 | 50 | 0.5 | 1500 | 2.4 | 7.4 |
| 290 | 50 | 0.5 | 1500 | 2.4 | 7.5 |
| 290 | 56 | 0.5 | 1500 | 2.6 | 7.0 |
| 290 | 65 | 0.5 | 1500 | 3.0 | 6.4 |

The invention claimed is:

1. A process for production of a hydrocarbon fraction from an oxygenate feedstock, comprising the steps of
providing a process feed comprising an amount of an ammonia precursor, hydrogen and an amount of said oxygenate feedstock, at a temperature above 200° C.,
directing said process feed to contact a material catalytically active in hydrodeoxygenation (HDO) under hydrotreating conditions to provide a hydrodeoxygenated intermediate product,
wherein said ammonia precursor provides an amount of ammonia corresponding to a partial pressure of NH3 in the presence of said material catalytically active in hydrodeoxygenation being at least 1.0 mbar and less than 20 mbar.

2. The process according to claim 1 wherein said partial pressure of NH3 is at least 1.0 mbar and less than 10 mbar.

3. The process according to claim 1 wherein said oxygenate feedstock comprises at least 50 wt/wt % fatty acid esters or fatty acids.

4. The process according to claim 1 wherein said oxygenate feedstock comprises at least 20 wt/wt % aromatics.

5. The process according to claim 1, wherein at least an amount of said ammonia precursor is provided in a separate liquid ammonia precursor stream.

6. The process according to claim 5, wherein at least an amount of said liquid ammonia precursor stream comprises an aqueous ammonia solution, a solution of an aqueous ammonia salt, or an amine.

7. The process according to claim 5, wherein said liquid ammonia precursor stream comprises an amount of ammonium, ammonia or amine withdrawn from a downstream process position.

8. The process according to claim 5, wherein said liquid ammonia precursor stream has a pH below 8.

9. The process according to claim 1, further comprising one or more additional process steps selected from the group consisting of hydrocracking, isomerization, and hydrodearomatization of intermediate streams in the process.

10. The process according to claim 9, further comprising the step of separating one or more intermediate streams into a gas stream, a non-polar liquid stream, and optionally a polar liquid stream prior to directing an amount of the non-polar stream to one or more of said additional process steps.

11. The process according to claim 10, wherein at least an amount of said gas stream, optionally after partial or full purification, is directed to be comprised in said process feed.

12. The process according to claim 10, wherein at least an amount of said polar liquid stream is directed to be comprised in said process feed.

13. The process according to claim 1, wherein said ammonia precursor comprises aqueous ammonia, amines, or ammonium salts.

14. The process according to claim 1, wherein the material catalytically active in hydrodeoxygenation (HDO) comprises one or more sulfided metals selected from the group consisting of nickel, cobalt, and tungsten, supported on a carrier comprising one or more refractory oxides.

15. The process according to claim 1, wherein the hydrotreating conditions comprise a temperature in the interval 250-400° C., a pressure in the interval 30-150 bar, and a liquid hourly space velocity (LHSV) in the interval 0.1-2 h$^{-1}$.

16. The process according to claim 1 wherein said partial pressure of NH3 is at least 1.0 mbar and less than 5 mbar.

* * * * *